Patented Feb. 19, 1924.

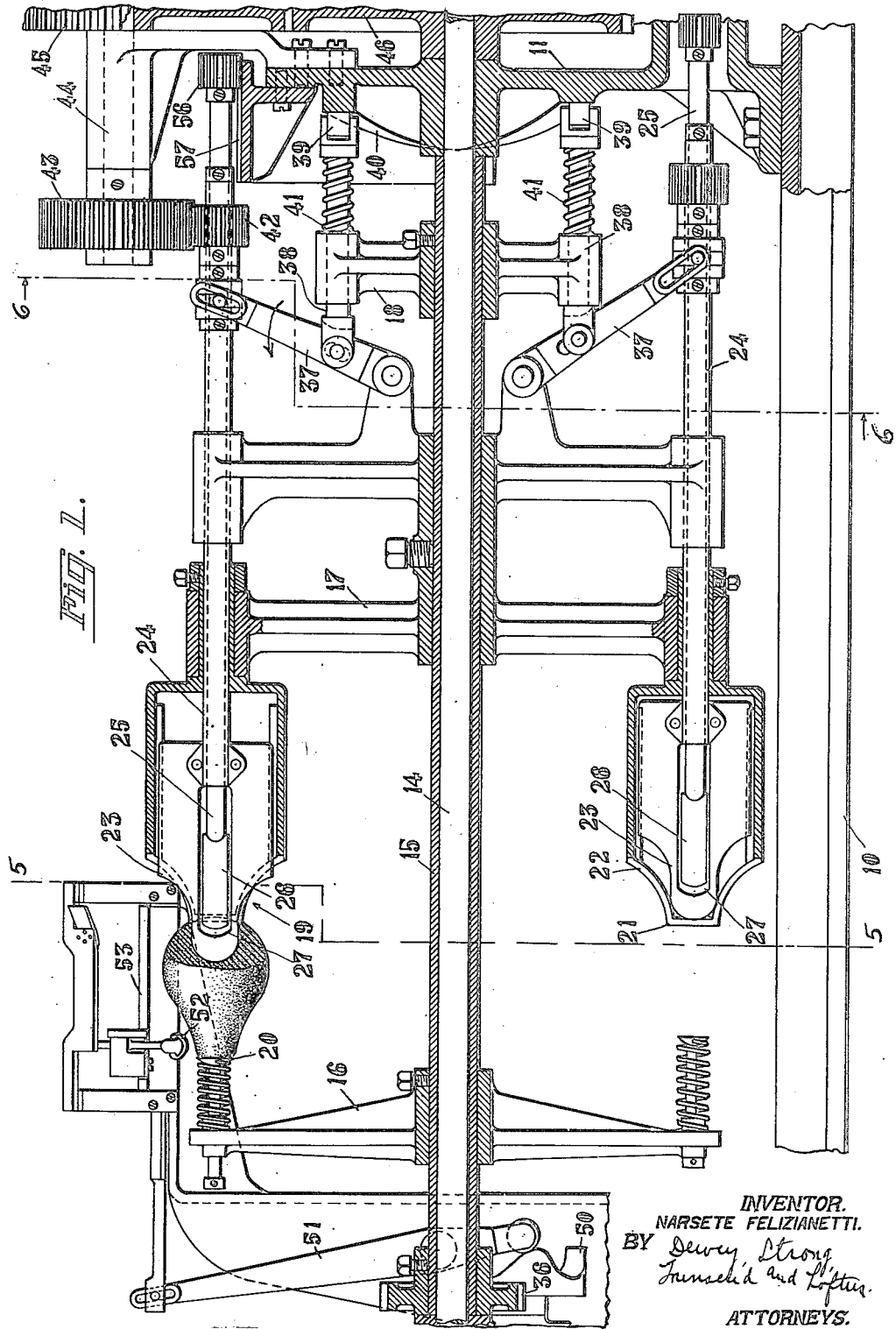

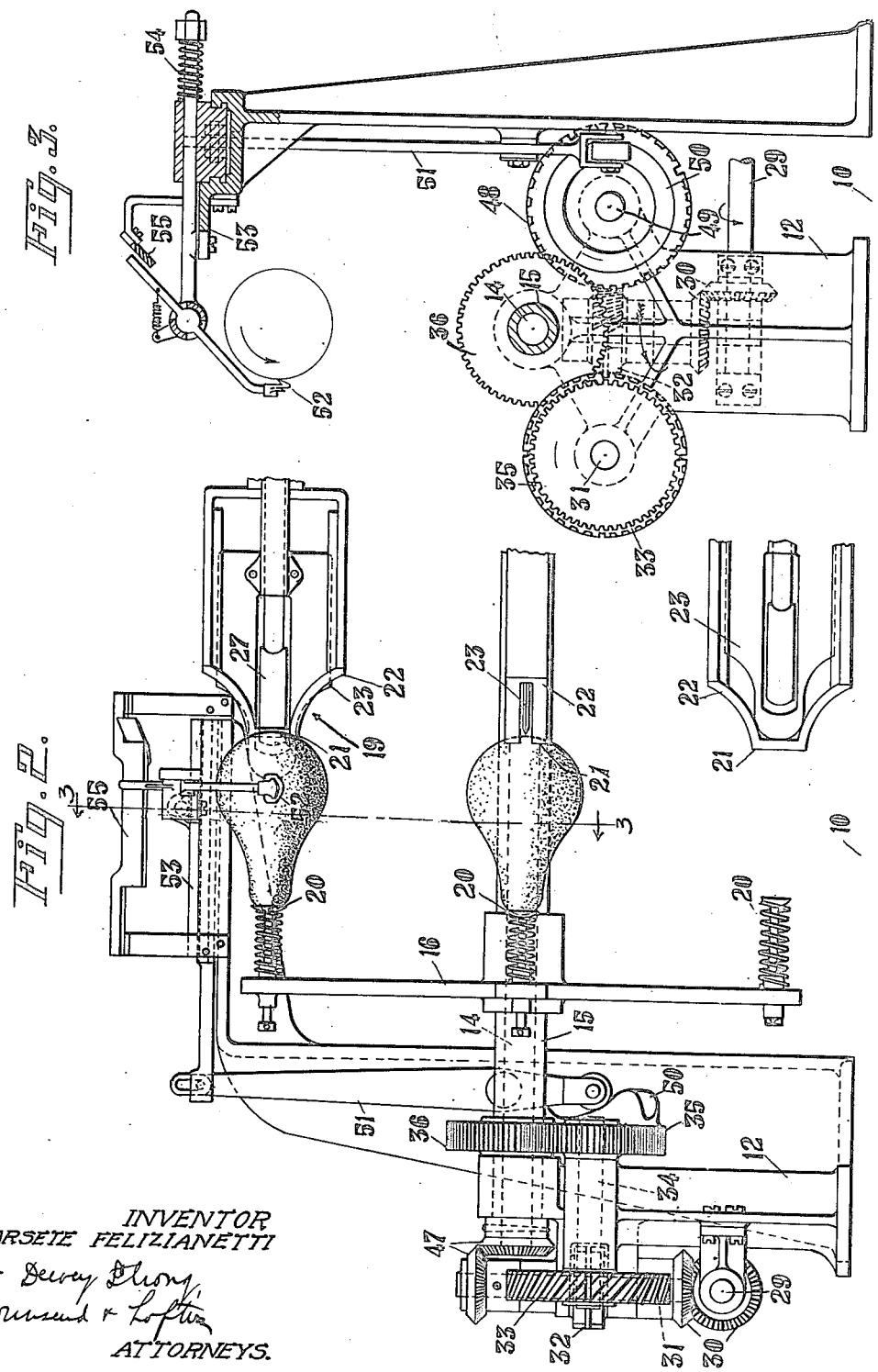

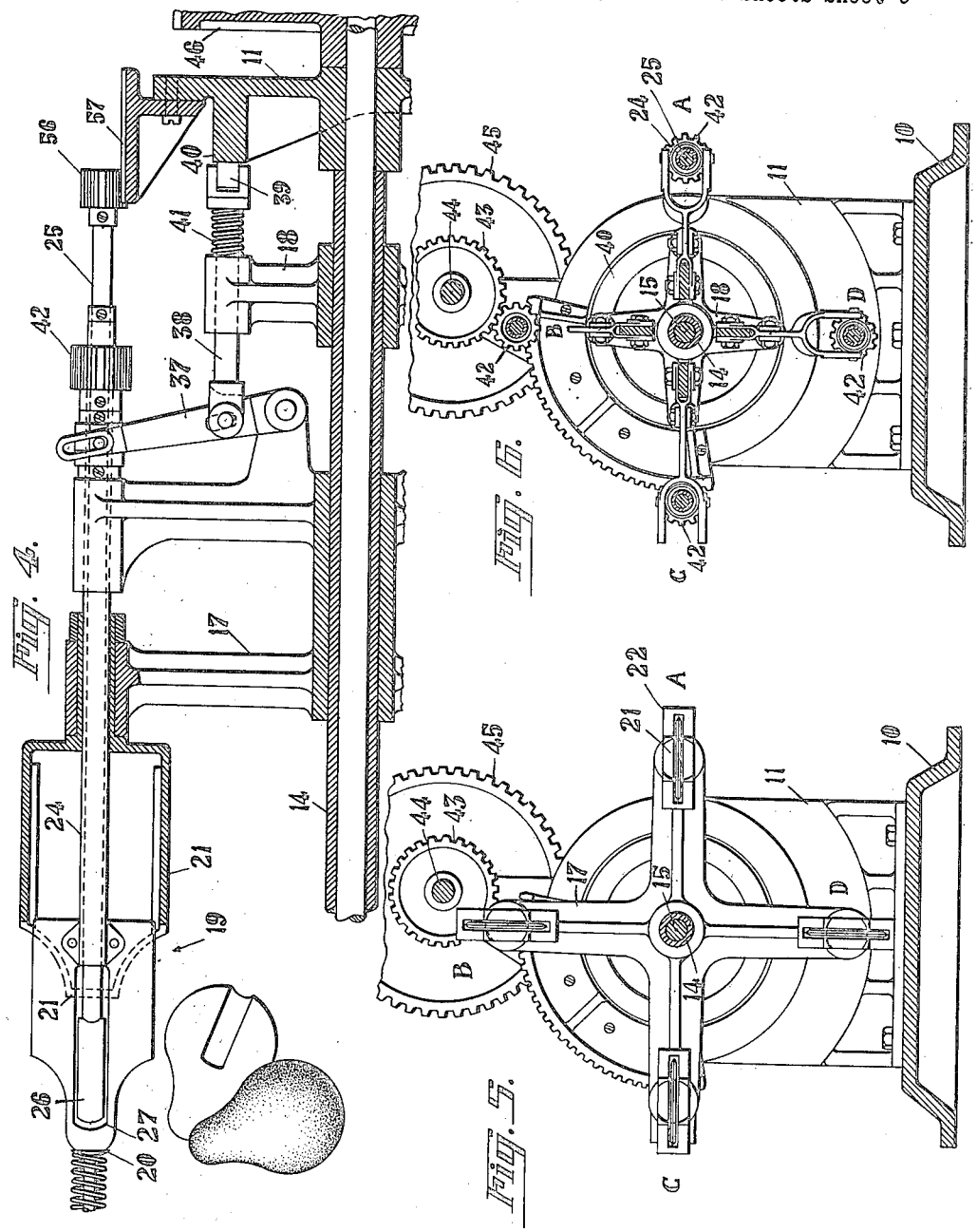

1,484,446

UNITED STATES PATENT OFFICE.

NARSETE FELIZIANETTI, OF SAN LEANDRO, CALIFORNIA.

MACHINE FOR PEELING AND CUTTING PEARS.

Application filed March 14, 1923. Serial No. 624,923.

*To all whom it may concern:*

Be it known that I, NARSETE FELIZIANETTI, a citizen of the United States, residing at San Leandro, county of Alameda, and State of California, have invented new and useful Improvements in Machines for Peeling and Cutting Pears, of which the following is a specification.

This invention relates to machines for preparing fruit, particularly pears, for drying or canning.

It is the object of the present invention to generally improve devices of the character referred to, so as to provide an efficient machine for automatically peeling, coring and halving pears.

In carrying out this object I provide a mechanism comprising a plurality of operating units which are intermittently driven about a common axis and to which fruit may be successively fed. The operating units mentioned embody coring and halving mechanism and co-operate with a peeling device, whereby fruit fed to the units will be successively peeled, cored and halved.

One form which the invention may assume is exemplified in the following description and illustrated in the accompanying drawings, in which—

Fig. 1 is a longitudinal section through the machine.

Fig. 2 is a fragmentary view in side elevation of the machine disclosing the main driving mechanism and the peeling device.

Fig. 3 is a view in transverse section through the machine taken on the line 3—3 of Fig. 2 in the direction of the arrows.

Fig. 4 is a fragmentary view in plan section disclosing one of the fruit-carrying units in halving position.

Fig. 5 is a transverse section through the machine taken on the line 5—5 of Fig. 1.

Fig. 6 is a similar view taken on the line 6—6 of Fig. 1.

Referring more particularly to the accompanying drawings, 10 indicates a stationary base having end frames 11 and 12 fixed at its ends. These frames support a central shaft 19 and a tubular shaft 15. Fixed on the tubular shaft 15 are three spiders 16, 17 and 18, which are adapted to be intermittently revolved a quarter of a revolution in unison. These spiders carry four operating units 19 to which fruit may be successively fed. These units are identical in construction and operation, and, therefore, it is believed sufficient to describe the construction and cycle of operation of but one unit.

Such an operating unit comprises a spring-pressed cup 20 mounted at the end of one of the arms of the spider 16, and which co-operates with a cup 21 formed on the end of a knife guide 22 to support a pear. The knife frame is turnably mounted at the end of one of the arms of the spider 17 and serves as a guide for a reciprocable halving blade 23. This blade is secured on the end of a reciprocable and rotatable tubular sleeve shaft 24 which is also journaled in the end of one arm of the central spider 17. A shaft 25 extends through the tubular shaft and is fitted at one end with a coring spoon 26, which is located in an aperture 27 formed in the halving blade 23.

It is intended to intermittently revolve the spiders to successively dispose the operating units 19 in the positions shown in Fig. 5. This is accomplished by driving mechanism clearly illustrated in Figs. 2 and 3. This mechanism comprises a suitably driven drive shaft 29 which is connected by bevel gears 30 to a vertical shaft 31. This shaft is fitted with a mutilated helical gear 32. This gear, when constantly driven, will intermittently drive a gear 33 fixed on a countershaft 34. The shaft 34 carries a gear 35 in constant driving engagement with a gear 36 fixed on the main tubular shaft 15. By this mechanism, the spiders mentioned are positively driven one-quarter of a revolution at intermittent periods. The period of rest of the spiders, in this instance, is of the same duration as the driving period.

A pear is fed in any suitable manner to the operating units when they are in the position indicated at A, Fig. 5. The spiders then rotate one-quarter of a revolution to dispose the unit to which the pear is delivered at the point B. During this movement of the spiders, the halving blade is inserted part way into the pear to firmly hold it in position. This is accomplished by mechanism best illustrated in Fig. 1. This mechanism comprises a lever 37 pivotally connected at its inner end to the spider 17. The outer end of this lever connects with the tubular sleeve shaft 24 in a manner permitting the latter to rotate. The lever 37 controls the axial movement of this shaft.

A horizontally reciprocable rod 38 is carried at the end of one arm of the spider 18 and is pivotally connected at one end to the lever 37. The other end of this rod is fitted with a cam roller 39 which is held in constant engagement with the surface of a stationary cam 40 by an expansion spring 41. This cam, as shown in Figs. 1 and 6, is circular and has a slight rise between the points A and B to slightly swing the lever 37, in the direction of the arrow shown in Fig. 1, to axially move the tubular sleeve shaft 29 and thereby cause the halving blade to penetrate the pear.

When the operating unit reaches the point B it is rapidly revolved to rotate the pear, so that the pear may be peeled or skinned.

To rotate the operating unit, a pinion 42 is fixed at the end of the tubular sleeve shaft. This pinion, when the unit is turned to the point B, meshes with a constantly rotating gear 43. This gear is fitted on a shaft 44 having a gear 45 in constant mesh with a gear 46 fixed on the constantly driven central shaft 14. This shaft is driven from the vertical shaft 31 by bevel gears 47.

When the operating unit reaches the point B and commences to revolve, the peeling mechanism is automatically brought into operation. This mechanism comprises a gear 48 fixed on a jack shaft 49. This gear meshes with the mutilated gear 32 and is driven thereby during the idle period of the gear 33 which drives the spiders. A surface cam 50 is fixed on the shaft 49 and actuates a lever 51 to slowly feed a peeling knife 52 longitudinally of the pear and then rapidly return it. The peeling knife travels along a pear shaped cam 53 and is held in contact with the pear by a spring 54. However, when the knife is returned, a track cam 55 maintains the peeling knife out of contact with the pear. The operation just described occurs during the rest period of the spiders, and, when finished, the spiders advance another step. During this step the pear is halved and cored.

During the travel of the operating units from the point B to the point C the cam 40 will cause the halving blade to advance and completely halve the pear. When in this position, the mechanism appears, as shown in Fig. 4. During the advance of the blade the coring spoon 26 is rotated by the shaft 25. This shaft is fitted at one end with a pinion 56, which meshes with a stationary segment 57 during the travel of the operating unit from the point B to the point C. Consequently, the coring spoon is revolved as the halving blade is fed through the pear and removes the core. The segment 57 is formed with a face of sufficient width to allow for axial movement of the pinion 56.

It is seen that when the operating unit reaches the point C, the pear has been peeled, cored and halved and is in condition for canning and drying. The cam 40 is constructed to return the halving blade to normal position during the travel of the units from the point C to the point D.

In operation, pears are fed to the operating units 19 as they successively reach the point A. During the travel of the units to the point B the halving blades penetrate the pears to firmly grip the same. Upon reaching the point B the operating units are rapidly revolved and the peeling mechanism is brought into operation to peel the pear. When this has been completed, the spiders rotate the units a second quarter of a revolution. During this period, the unit leaving the point B will be actuated to rotate the coring spoon and advance the halving blade completely through the pear to halve and core the same. The blade is returned to normal position during the units' travel from the point C to D.

While in the present case I have shown four units, it is understood that any number of units may be employed; also that the construction and combination of the various parts of the device may be changed by those skilled in the art without departing from the spirit of the invention as claimed.

Having thus described my invention, what I claim and desire to secure by Letters Patent is:

1. In a machine of the character described, a plurality of operating units mounted for movement about a common axis, said units comprising a halving blade, means for supporting a fruit in an operative position relative to said blade, and means for reciprocating said blade to halve the fruit.

2. In a machine of the character described, a peeling mechanism, a plurality of operating units mounted for intermittent movement about a common axis, said operating units comprising a halving blade and means for supporting a fruit in an operative position relative to said blade, means for revolving each unit as it reaches a certain point in its cycle of operation and means operating in synchronism therewith to actuate the peeling mechanism when the fruit is revolved by the unit and to reciprocate said blade when the fruit has been peeled.

3. In a machine of the character described, an operating unit comprisng a halving blade, means for receiving and holding a fruit in a position to be operated on by said blade, means for successively rotating and reciprocating said blade, and a peeling mechanism co-operating with the blade during the rotation thereof to peel the fruit.

4. In a machine of the character described, an operating unit comprising a halving blade, means for supporting a fruit in position to be operated on by said blade, means for successively rotating and reciprocating said blade, a coring spoon operable in conjunction with a blade to core the fruit when said blade reciprocates to halve the same, and a peeling mechanism operating in synchronism with the blade to peel the fruit when said blade is operating to rotate the fruit.

5. A machine of the character described, an operating unit comprising spring-pressed means for holding a fruit, a blade mounted adjacent said means for penetrating and halving the fruit, means for successively rotating the blade to rotate the fruit and reciprocating the blade to halve the fruit, a coring device operable in conjunction with the blade, means to rotate said coring device during the reciprocation of the blade, and a peeling mechanism operating in synchronism with the blade to peel the fruit when the same is being rotated.

6. In a machine of the character described, a frame, a shaft therein, a fruit-receiving and supporting unit adapted to be revolved around the shaft step by step, a severing blade included in said unit and adapted to operate on a fruit carried thereby, cam means for operating the blade during the rotation of the unit whereby the blade will penetrate the fruit during one step and advance completely therethrough during the succeeding step, means for rotating the blade to rotate the fruit during the rest period between said steps, and a peel-mechanism operable during said rest period to peel the fruit.

7. In a machine of the character described, a frame, a shaft journaled therein, a fruit-receiving and supporting unit adapted to be revolved about the shaft step by step, a severing blade included in said unit and adapted to operate on a fruit carried thereby, said blade being mounted for reciprocation parallel to said shaft, a shaft fixed to the blade, a cam carried by the frame and operating against the shaft of the blade to reciprocate the same to penetrate a fruit carried by the unit during one step of rotation of the unit and to advance completely through the fruit during the succeeding step, a gear on the shaft of the blade, a constantly rotating gear carried by the frame adapted to mesh with the gear on the shaft of the blade during the rest period of the unit occurring between said steps of rotation to revolve the blade and thereby rotate the fruit, and a peeling mechanism operating during said rest period to peel the fruit when revolved.

8. In a machine of the character described, a frame, a shaft journaled therein, a fruit-receiving and supporting unit adapted to be intermittently revolved about said shaft, a severing blade included in said unit, a shaft connected with the blade and mounted for reciprocation in a path parallel to the first-mentioned shaft to operate upon a fruit carried by the unit, a stationary cam carried by the frame, and mechanism associated with the cam and the shaft of the blade whereby the cam will reciprocate the blade to sever a fruit carried by the unit during the rotation of the unit.

9. In a machine of the character described, a frame, a shaft journaled therein, a fruit-receiving and supporting unit adapted to be revolved about the shaft step by step, a severing blade included in said unit and adapted to operate upon a fruit carried thereby, a reciprocable hollow shaft connected to the blade, a stationary cam carried by the frame and acting against the hollow shaft to reciprocate the same during the steps of rotation of the unit to cause the blade to sever a fruit carried by the unit, said blade having an aperture therein, a coring spoon in said aperture, a shaft connected to said spoon and extending through the hollow shaft, said spoon being reciprocable in unison with the blade, and means for rotating said spoon when it and the blade are being advanced through a fruit carried by the unit.

10. In a machine of the character described, a plurality of operating units mounted for step-by-step rotation about a common axis, said units comprising means for supporting a fruit, a reciprocable halving blade positioned to operate on a fruit supported by said means, a coring spoon, means for advancing said blade and the coring spoon through the fruit to halve the same during the rotation of the units and means for rotating the coring spoon during said operation to core the fruit.

11. In a machine of the character described, a plurality of operating units mounted for step-by-step rotation about a common axis, said units comprising means for receiving and supporting a fruit, a reciprocable halving blade positioned to operate on a fruit supported by said means, a peeling mechanism, means for rotating each unit as it reaches a certain point in its cycle of operation, a peeling mechanism, operating means therefor operative when each unit is revolved to actuate the peeling mechanism to peel the fruit, a coring spoon in each unit and reciprocable in unison with the halving blade, means for advancing the blade and spoon of each unit through the fruit during the step of rotation of each unit following the peeling of the fruit, and means for rotating said coring spoon during said operation to core the fruit.

NARSETE FELIZIANETTI.